Oct. 19, 1965 J. G. STEPHENS 3,212,770
ADJUSTABLE ROTATABLE CYLINDER HEAD SUPPORT
Filed Oct. 12, 1962 2 Sheets-Sheet 1
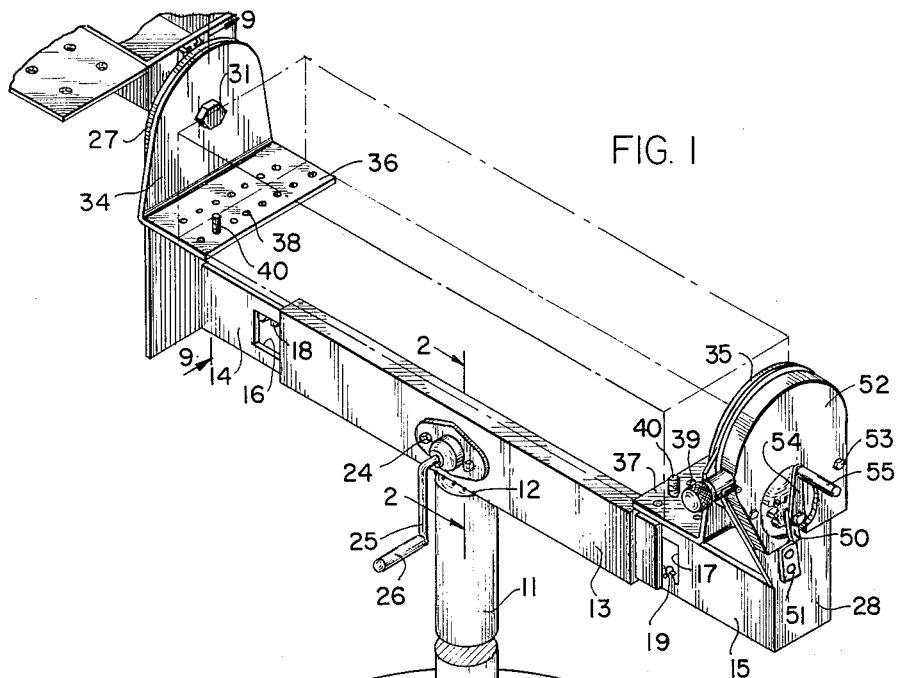
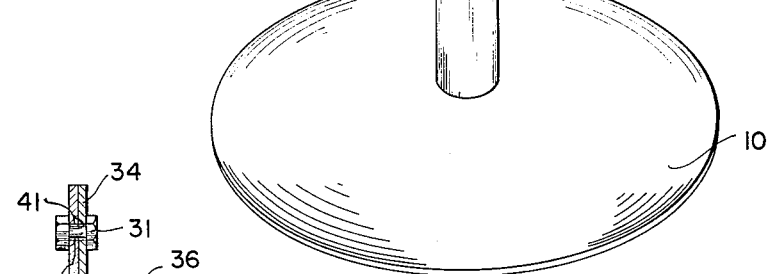
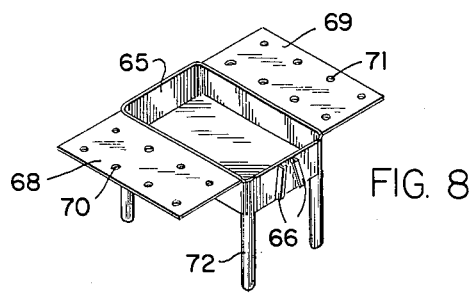
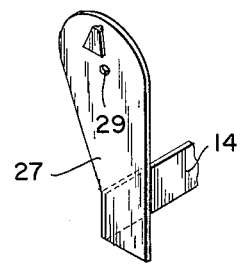
INVENTOR
J. G. STEPHENS
BY
ATTORNEY

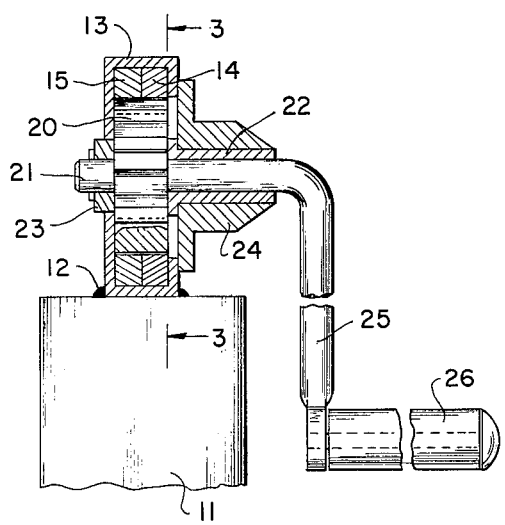
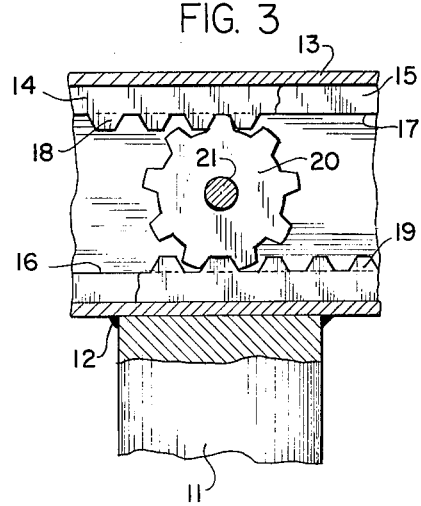
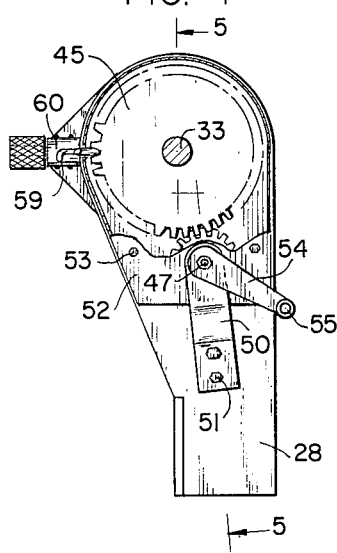
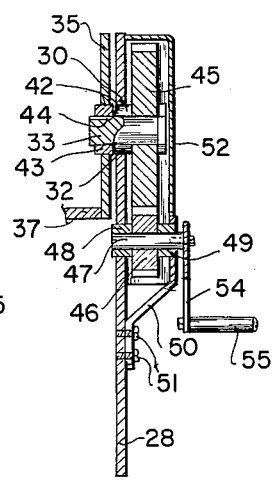
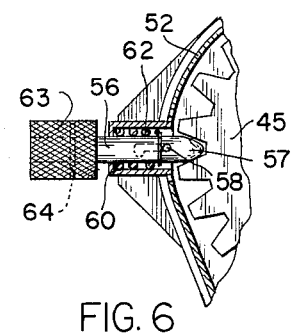

United States Patent Office 3,212,770
Patented Oct. 19, 1965

3,212,770
ADJUSTABLE ROTATABLE CYLINDER HEAD SUPPORT
Jaffery G. Stephens, P.O. Box 306, New Hope, Ala.
Filed Oct. 12, 1962, Ser. No. 230,162
3 Claims. (Cl. 269—61)

This invention relates to shop equipment of various kinds including that employed for the repair of automobile engines and other relatively heavy articles which it is desired to support in various positions for ready access thereto to facilitate the necessary work thereon.

The invention relates particularly to a rack for supporting the cylinder head of an internal combustion engine or the like in various positions for performing various operations thereon including repair as well as in the process of manufacture and involving the supporting of the unit detached from other parts with which it is normally associated in use.

In the manufacture and maintenance and repair of machinery and other equipment including internal combustion engines it is necessary to perform work upon various parts of the head and such work must be within close tolerances. This requires supporting the head in various positions from a central portion, preferably accessible on all sides, to facilitate grinding and replacing valves, performing drilling, milling and grinding, and other operations.

Various types of racks and supports have been used but these have been found cumbersome, required excessive floor space, were expensive and difficult to operate, as well as requiring skill and time in the adjustment and operation of the same in connection with heads and other objects of varying size and for securing the same in various positions.

It is an object of the invention to provide a relatively simple and inexpensive rack for supporting a cylinder head or other equipment and which rack is of small size, can be easily adjusted to accommodate heads of various types and sizes and to support them in a position for easy access thereto as well as permit them to be readily movable to other positions.

Another object of the invention is to provide a cylinder head rack mounted on a pedestal having convenient horizontal and rotational adjustments for the support of the cylinder head or other object as well as a rack having means for supporting necessary tools, fixtures and other articles apart from the head.

Other objects and advantages of the invention will be apparent from the following description considered in conjunction with the accompanying drawings wherein:

FIG. 1 is a perspective of a rack illustrating one application of the invention;

FIG. 2, an enlarged fragmentary central vertical section on the line 2—2 of FIG. 1;

FIG. 3, a vertical section on the line 3—3 of FIG. 2;

FIG. 4, an elevation on an enlarged scale with parts broken away to reveal the end crank mechanism;

FIG. 5, an upright section on the line 5—5 of FIG. 4;

FIG. 6, an enlarged fragmentary detail of the end crank locking mechanism;

FIG. 7, an enlarged perspective of the end plate to which a holder for tools and parts may be attached;

FIG. 8, an enlarged perspective of the holder carried by the end plate of FIG. 7; and FIG. 9 is a vertical section through one of the brackets on the line 9—9 of FIG. 1.

Briefly stated, the rack of the present invention includes a pedestal mount on which a horizontal sleeve of rectangular cross section is rigidly supported and within which parallel rack-forming bars extend where they are engaged by a single pinion rotatable by means of a handle to cause such rack members and upstanding brackets carried at the bottom ends thereof to be relatively adjusted to accommodate various length cylinder heads or other objects, such brackets having ledge or support portions to which the heads may be secured. Each of the brackets is provided with a supporting pivot to one of which pivots is fixed a gear which meshes with a rotating pinion having a crank handle for operating the same and by means of which the device supported may be rotated to any desired position and secured in such position by means of a spring projected pin or detent which engages the gear attached to the pivot carrying one of the racks.

With continued reference to the drawings, the invention includes a pedestal mount having a base 10 and a post 11. On the upper end of the post 11 is fixed by welding 12 or other means a horizontal housing forming tube or sleeve 13 preferably of generally rectangular cross section.

Within the housing 13 is slidably mounted a pair of rack forming bars 14 and 15 having elongated slots or openings 16 and 17 with the upper edge of the slot 16 provided with a depending rack 18. The slot 17 of the slidable rack bar 15 likewise is provided with an upstanding rack 19.

A pinion 20 (FIGS. 2 and 3) is disposed between the racks 18 and 19 and fixed on a shaft 21 rotatably supported on the sleeve 13 by bearings 22 and 23. The bearing 22 is carried within a retainer 24 attached to the front of the housing 13 and the bearing 23 is welded or otherwise attached to the rear of such housing. The shaft 21 is provided with a crank 25 and a crank handle 26 by means of which the pinion 20 may be rotated and the rack carrying bars moved endwise in opposite directions relative to each other.

To the remote ends of the rack bars 14 and 15 are rigidly attached upstanding brackets or end plates 27 and 28 respectively having openings 29 (FIGS. 7 and 9) and 30 (FIG. 5) for the reception of a pivot bolt 31 in the bracket 27 and a bearing 32 in the opening 30 in which bearing a pivot pin 33 is received. The pivot bolt 31 and the pivot pin 33 are disposed in substantially axial alignment and rotatably receive generally L-shaped supporting brackets 34 and 35 respectively. Such brackets have generally horizontal portions 36 and 37 having openings 38 and 39 for receiving fasteners 40 by which cylinder heads or other devices are secured to the brackets 34 and 35.

The bracket 34 has an opening 41 (FIG. 9) in which the pivot bolt 31 is received and the bracket 35 has an opening 42 in which is received an enlarged ring 43 in which the end of the pivot 33 is attached by a key 44. A cylinder head or other device to be supported is placed between the brackets 34 and 35 on the shelf portions 36 and 37 where it is attached by the fasteners 40. The spacing of the brackets to accommodate such cylinder head is accomplished by rotation of the handle 26.

In order to produce rotation of the brackets 34 and 35 the pivot 33 has attached thereto a gear 45 engaged by a pinion 46 mounted on a shaft 47 carried in bearings 48 and 49, the bearing 48 being mounted in the end plate 28 and the bearing 49 being mounted in a bracket 50 secured by fasteners 51 to the end plate 28. The gear 45 may be provided with a cover plate or housing 52 held in place by fasteners 53. To the end of the shaft 47 is attached a crank arm 54 having a handle 55 mounted at its outer end. When the crank handle 55 is rotated the shaft 47 and pinion 46 likewise are rotated thereby imparting rotation to the gear 45 carrying with it the L-shaped bracket 35 and in view of the fact that the bracket 34 is attached to the work it likewise will be rotated about its pivot 31.

In order to maintain the bracket 34 and 35 and the work in a definite fixed position, a spring pressed detent 56 having a wedge tooth extremity 57 is provided such detent having a pin projection 58 operating in a bayonet slot 59 in a housing 60, a washer 61 being provided which rests against the pin 58 and is urged endwise by a spring 62 within the housing 60. On the outer end of the detent 56 is an operating knob 63 fixed by a pin 64 to the detent. When the operating knob 64 is retracted or moved to the left of FIG. 6 the beveled or toothed end 57 of the detent will be retracted against the action of the spring 62 and withdrawn from the teeth of the gear 45, permitting the rotation of the gear by the handle 55 until such time as the detent is released whereupon it will be locked. The gear 45 will be locked in place as will the bracket 35 and through the work the bracket 34. The detent may be retained in retracted position by moving the pin 58 into the bayonet slot 59.

In order to provide convenient holding means for tools and small parts a generally rectangular holder or container 65 may be provided having a pair of dovetail bracket members 66 in which is received a complementary bracket 67 carried by the fixed end plate 27. The container 65 has shelf forming flanges 68 and 69 at opposite sides thereof, the shelf 68 having receiving openings 70 and the shelf 69 having receiving openings 71 which openings 70 and 71 are adapted to receive various tools and needed parts.

It will be apparent that the holder 65 may be detached from the device and in order to support it upon a work bench or the like after it is detached it may be provided with legs 72.

It will be apparent from the foregoing that a relatively simple practical inexpensive adjustable support is provided for holding work of varying sizes in various positions.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A cylinder head rack comprising a pedestal, a lateral support mounted on said pedestal, bar members mounted for slidable movement on said support, said bar members having integral rack means, a pinion mounted on said support and engaging said rack means whereby rotation of said pinion will move said bar members in opposite directions along said support, ledge means rotatably mounted at the ends of said bar members remote from the portions adjacent said support, the axis of rotation of said ledge members being coincident with and substantially parallel to said lateral support, means for rotating one of said ledge means and means for selectively fixing the position of said rotating means.

2. Apparatus for holding heavy objects comprising a base, a support on said base, a sleeve attached to the upper end of said support, rack forming members mounted for sliding movement in said sleeve, a pinion carried by said sleeve and engaging said rack forming members for moving said members in opposite directions, an upstanding end member attached to one end of each of said rack forming members, ledge means rotatably mounted on each side of said end members, one of said ledge means being removably fixed to a rotatable shaft, a gear mounted on the remote end of said shaft, a pinion meshing with said gear and rotatable by a crank, a spring loaded detent engageable with the teeth of said gear to prevent rotation thereof, and means for maintaining said detent out of engagement with said gear whereby objects supported by said apparatus may be rotated to any desired position and locked against further rotation.

3. Apparatus for supporting an object comprising a base, a plurality of movable support members carried by said base, means for moving said support members simultaneously in opposite directions, an adjustable work engaging member rotatably mounted on one end of each of said support members and remote from each other, means for rotating at least one of said work engaging members, the axis of rotation of said one work engaging member being coincident with and substantially parallel with said support members, and means for fixing said one work engaging member in adjusted position, whereby an object can be mounted on said work engaging members and selectively rotated and thereafter fixed in adjusted position.

References Cited by the Examiner
UNITED STATES PATENTS

| | | | |
|---|---|---|---|
| 194,830 | 9/77 | Lilly | 269—227 |
| 909,469 | 11/09 | Solberg | 269—61 |
| 1,468,397 | 9/23 | Radke et al. | 269—61 |
| 1,481,503 | 1/24 | Carswell et al. | 269—61 |
| 1,812,585 | 6/30 | Collins | 269—17 X |
| 2,913,241 | 11/59 | Miner | 269—61 |

ROBERT C. RIORDON, *Primary Examiner.*

THOMAS J. HICKEY, *Examiner.*